Inventor
Herbert J. Wollner
by Roberts, Cushman & Woodbury
Attys.

Sept. 16, 1947.  H. J. WOLLNER  2,427,435
COMPARISON METHOD OF DETERMINING FOREIGN MATTER
IN WOOL AND OTHER MATERIAL
Filed Aug. 18, 1943  3 Sheets-Sheet 2
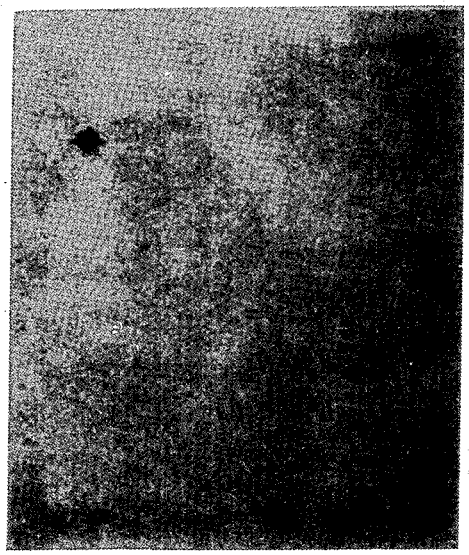
Fig.3
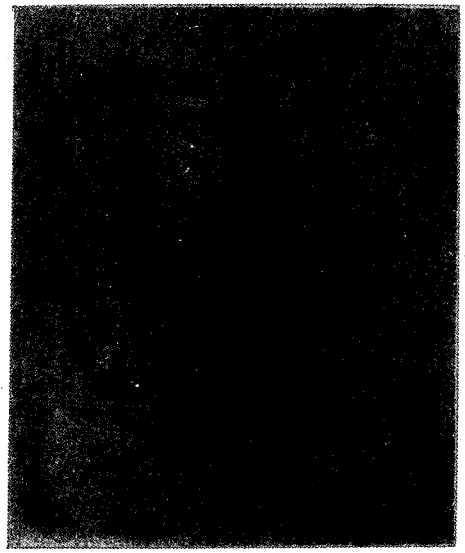
Fig.3a
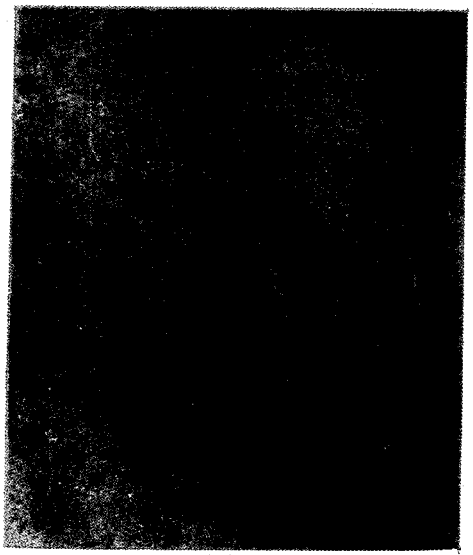
Fig.4
Fig.4a
Inventor
Herbert J. Wollner
by Roberts, Cushman & Woodbury
Attys.

Sept. 16, 1947.  H. J. WOLLNER  2,427,435
COMPARISON METHOD OF DETERMINING FOREIGN MATTER
IN WOOL AND OTHER MATERIAL
Filed Aug. 18, 1943  3 Sheets—Sheet 3

Inventor
Herbert J. Wollner
by Robert, Cushman & Woodbury
attys.

UNITED STATES PATENT OFFICE 2,427,435

COMPARISON METHOD OF DETERMINING FOREIGN MATTER IN WOOL AND OTHER MATERIAL

Herbert J. Wollner, Washington, D. C., assignor, by mesne assignments, to Baird Associates, Inc., Cambridge, Mass., a corporation of Massachusetts Application August 18, 1943, Serial No. 499,095

3 Claims. (Cl. 88—14)

In testing and grading various kinds of material it is frequently necessary to determine the kind and amount of foreign matter in a mass of material. Typical examples are fibrous materials such as wool, cotton, rayon and other natural and synthetic fibers, as well as crystalline materials of various kinds. For example in grading wool it is necessary to determine the weight of intermixed vegetable material such as spiral burrs, cockle burrs, sand burrs, oats and small fragments and slivers commonly called shives. Inasmuch as this vegetable matter is intermixed through the wool and clings tightly thereto, it is difficult to make the aforesaid determination. The methods commonly used comprise the hand-picking method, the sodium hydroxide method and the carbonizing method.

In the hand-picking method the operator carefully searches the wool and removes the vegetable matter piece by piece. The removed pieces are thoroughly cleaned and then weighed to determine the percentage of vegetable matter. By this method it may require more than a week to test a sample of 50 grams. Thus while this is the most accurate method heretofore known, it is also the most time consuming.

The sodium hydroxide method is much more rapid but not nearly so accurate. The wool is dissolved in boiling sodium hydroxide solution and the vegetable matter is then removed by filtering or centrifugal action. The residue is washed, dried and weighed. Inasmuch as a variable quantity of lignin and other components in the vegetable matter also dissolves, the method is not accurate.

In the carbonizing method the wool is steeped in a solution of sulphuric acid or aluminum chloride, then centrifuged or squeezed, dried, crushed, dusted, neutralized, rinsed and dried. The loss in weight is assumed to be the vegetable matter. Actually a significant quantity of wool is also lost in the process, particularly in the case of very burry wools. Notwithstanding its shortcomings the carbonizing method is the one most widely used in the removal of vegetable matter from wool.

Objects of the present invention are to provide a method of testing and grading masses of material which is quick and easy to practice, which is accurate and reliable in use, which does not require hand-picking, which does not require dissolution or carbonization of the material, which requires only simple, inexpensive and compact apparatus, and which is generally superior to the methods heretofore used.

According to the present invention the material is submerged in a liquid having substantially the same index of refraction as that of the material and light is transmitted through the submerged material to display the foreign matter, the material becoming substantially transparent when its index of refraction matches that of the liquid so that the foreign matter is rendered visible for comparison with charts depicting similar foreign matter respectively. While the charts may comprise only one chart for each kind of foreign matter and each chart may show only a single piece or any desired number of pieces of foreign matter, the charts are preferably made in sets each set comprising graduated charts depicting predetermined amounts respectively of a particular kind of foreign matter. By selecting the chart depicting substantially the amount of foreign matter corresponding to that buried in the mass of material, the amount of foreign matter in the sample is indicated by the number of the selected chart. The aforesaid comparison may be made by eye or by means of any suitable electrical device such as a scanning device.

The aforesaid illumination may be from the top bottom or side or from any intermediate angle and it may be effected with various kinds of light such as a monochromatic light, polarized light or ordinary daylight. If the illumination is from the bottom the foreign matter is of course displayed in silhouette.

In the preferred embodiment the invention is further characterized as follows. The aforesaid charts are in the form of transparencies and are viewed with transmitted light of approximately the same intensity and color as that of the light transmitted through the submerged material. The charts are arranged in sets, each set depicting graduated amounts respectively of one kind of foreign matter and the different sets depicting different kinds of foreign matter respectively. For example one set may depict spiral burrs, another set cockle burrs, etc. For more accurate determination two or more sets may be provided from each kind of foreign matter. For example one set may depict large cockle burrs and another set small cockle burrs.

When using charts in the form of transparencies they may be stacked in superposition to simulate the appearance of the various kinds of foreign matter intermixed. In grading wool for example the operator may first select the transparency showing approximately the same size and number of spiral burrs, then the transparency showing approximately the same size and number of shives, etc., placing one transparency over the other until all kinds of foreign matter have been matched, whereupon the appearance of the superposed transparencies simulates the appearance of the submerged material. Instead of viewing the transparencies directly they may be viewed indirectly by projecting them either successively or in superposition on a screen adjacent the sample of submerged material. The graduated transparencies may be numbered so that it is necessary merely to add their numbers to determine the amount of foreign matter in the material being tested. The preferred method of making the transparencies is to photograph samples of submerged material having graduated amounts of foreign matter of different kinds. From the negatives thus obtained positives may be printed on glass or film to form the aforesaid transparencies.

For the purpose of illustration a typical embodiment of apparatus for practicing the invention is shown in the accompanying drawings in which Figs. 1 and 1a are two charts selected from a set showing different amounts of spiral burrs;

Figs. 3 and 3a are two charts selected from a set showing different amounts of sand burrs;

Figs. 4 and 4a are two charts selected from a set showing different amounts of shives;

Figure 6:
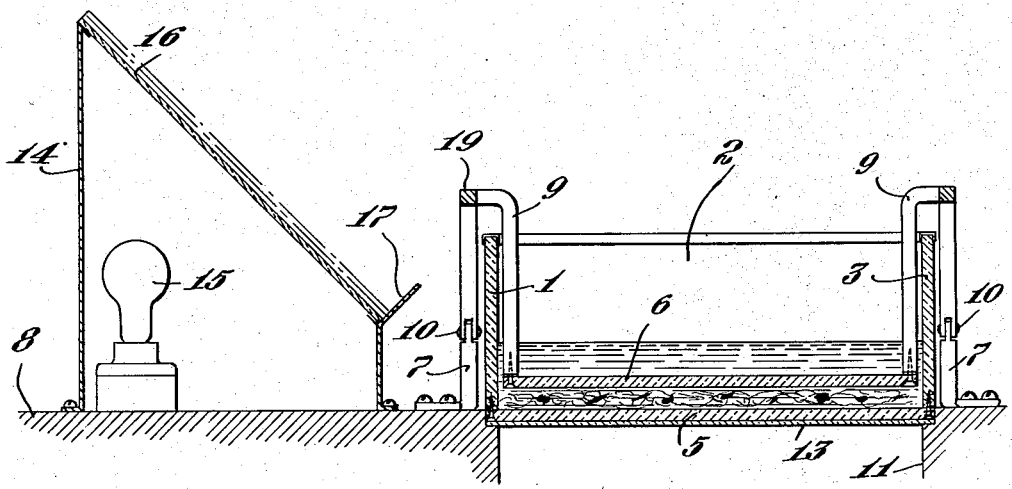
Fig. 6 is a cross-section of the apparatus.

The particular embodiment of apparatus for practicing the invention chosen for the purpose of illustration comprises a container for the material having side walls 1, 2, 3 and 4, a bottom 5 and a cover 6 which fits loosely into the container. The bottom and cover are made of transparent material such as glass or plastic and if desired the sides may be made of the same material. The cover is pivotally mounted on brackets 7, fast to table 8 or other suitable support, the cover having arms 9 connected to a bail 19 which is pivotally connected to the brackets at 10. The container is disposed over an opening 11 so that light may be transmitted from a suitable source 12 upwardly through the material in the container. The light transmitted through the container should be diffused so that the intensity is approximately the same throughout the entire area; and if the bottom of the container is too transparent to serve this purpose a ground glass may be interposed at 13. When using a color filter as mentioned hereinafter it too may be placed against the bottom of the container. By setting the container into a recess in the support as indicated in Fig. 6 the diffusing and color filter plates under the container may be readily changed merely by lifting the container out of the recess.

The means for displaying the aforesaid transparencies preferably comprises a light housing 14 containing a light source 15, the housing having an inclined support for the transparencies and a diffusing screen 16 so that both the container and transparencies may be viewed at right angles from a point a short distance above the container. For best results the light transmitted through the diffusing screen 16 has approximately the same color and intensity as that of the light transmitted through the submerged material. Screen 16 may also serve as a color filter or a separate color filter plate may be placed over or under the screen. By providing an extended support such as indicated at 17 a number of transparencies may be stacked in superposition.

Figure 1:
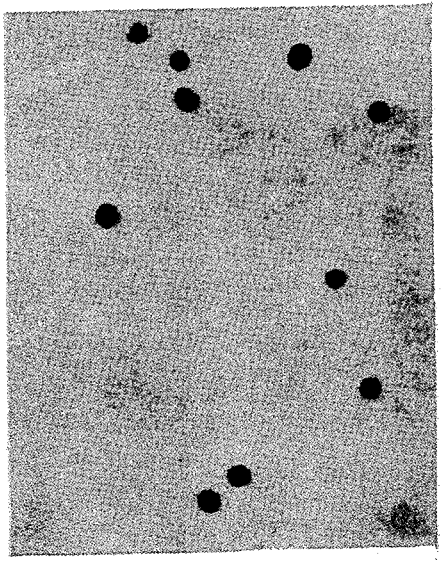
Figure 1A:
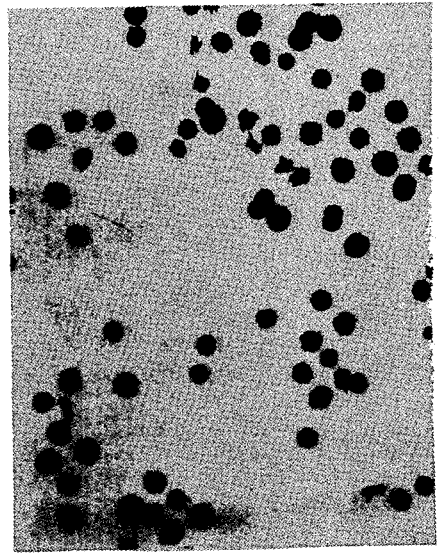
Figure 2:
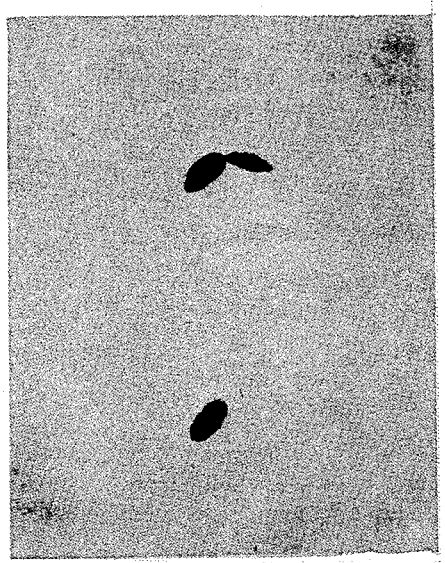
Figs. 2 and 2a are two charts selected from a set showing different amounts of cockle burrs.
Figure 2A:
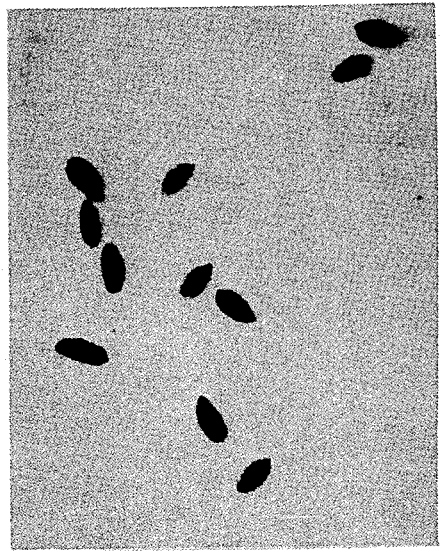
Figure 5:
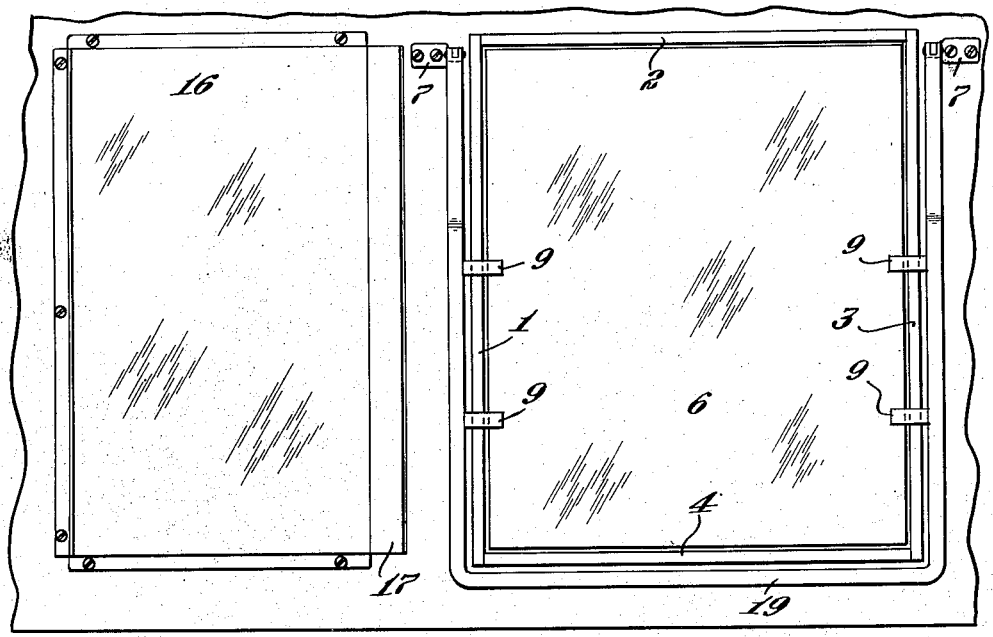
Fig. 5 is a plan view of the apparatus.

To grade a sample of material the liquid is preferably poured into the container first and then a mass of material of predetermined weight is dropped into the liquid in approximately uniform distribution throughout the horizontal cross-sectional area of the container. The cover 6 is then swung down to the position shown in Figs. 5 and 6 to hold the material near the bottom of the container in a shallow layer. For each kind of foreign matter contained in the material the operator selects from the corresponding set of charts the particular chart displaying approximately the same amount of that particular kind of foreign matter. If his first selection does not match the appearance of the submerged material, with respect to that kind of foreign matter, then he selects another chart from the same set showing more or less of the same kind of foreign matter. After matching one kind of foreign matter the selected chart is preferably though not necessarily left on the support 17 over the ground glass 16 while the sample is being matched for each of the other kinds of foreign matter contained therein, each selected chart being left on the support 17 over the previously selected charts. After all of the charts have been selected, the appearance of the stack of superposed charts should simulate that of the submerged sample with respect to all kinds of foreign matter.

While the area of the charts need not be the same as that of the container, it simplifies the procedure to have them equal. The charts are preferably photographed from series of samples in the container itself and then printed full size, each series of samples being carefully prepared with graduated amounts of only one kind of foreign matter.

The index of refraction of wool is usually about 1.555 and a relatively transparent liquid having this index of refraction may be made according to either of the following formulae.

| | Parts |
|---|---|
| Quartz testing oil B (petroleum oil distillate made by Socony Vacuum Oil Co.) | 9 |
| Monochlornaphthalene | 1 |
| Kerosene | 200 |
| Monochlornaphthalene | 175 |

If the color of the wool or other material differs from that of the liquid the difference should be neutralized by coloring the liquid to match the material or by filtering the viewing light to make it match the color of the liquid; and this applies both in photographing the aforesaid charts from predetermined samples and also in comparing the charts with other samples. And in comparing the charts with samples the color of the light from the chart should be matched with that from the liquid, as for example by filtering the chart light.

It should be understood that the present disclosure is for the purpose of illustration only and that this invention includes all modifications and equivalents which fall within the scope of the appended claims.

I claim:

1. In the art of determining the amounts of foreign matter of different kinds buried in a mass of non-transparent material, the method which comprises submerging the material in a liquid having substantially the same index of refraction as that of the material, transmitting light through the submerged material to display the foreign matter, and then comparing the display of foreign matter with sets of graduated charts, each set depicting predetermined amounts respectively of one kind of foreign matter and the different sets depicting different kinds of foreign matter respectively, thereby to determine the charts depicting substantially the amounts of foreign matter of different kinds corresponding to that buried in said mass of material.

2. In the art of determining the amount of foreign matter buried in a mass of non-transparent material, the method which comprises submerging the material in a liquid having substantially the same index of refraction as that of the material, transmitting light through the submerged material to display the foreign matter, and then comparing the display of foreign matter with sets of graduated transparencies, each set depicting predetermined amounts respectively of one kind of foreign matter and the different sets depicting different kinds of foreign matter respectively, the transparencies being displayed with transmitted light of approximately the same intensity as that of the aforesaid light, thereby to determine the transparencies depicting substantially the amounts of foreign matter of different kinds corresponding to that buried in said mass of material.

3. In the art of determining the amount of foreign matter buried in a mass of non-transparent material with sets of graduated transparencies, each set depicting predetermined amounts, respectively, of one kind of foreign matter and the different sets depicting different kinds of foreign matter respectively, the method which comprises submerging the material in a liquid having substantially the same index of refraction as that of the material, transmitting light through the submerged material to display the foreign matter, visually estimating the amounts of the different kinds of foreign matter in said material, making a trial selection from the sets respectively of transparencies which when superposed should match the appearance of said foreign matter, superposing the selected transparencies and, with transmitted light of approximately the same intensity as that of the aforesaid light, making a comparison of the display of foreign matter with the superposed transparencies to determine whether the selected transparencies when viewed in superposition simulate the appearance of the various kinds of foreign matter intermixed and substituting other transparencies until such simulation is obtained.

HERBERT J. WOLLNER.

REFERENCES CITED

The following references are of record in the file of this patent:

UNITED STATES PATENTS

| Number | Name | Date |
|---|---|---|
| 2,313,143 | Gerber | Mar. 9, 1943 |
| 2,264,380 | Hawk | Dec. 2, 1941 |
| 1,766,037 | Dawson | June 24, 1930 |
| 251,721 | Lomb et al. | Jan. 3, 1882 |

FOREIGN PATENTS

| Number | Country | Date |
|---|---|---|
| 592,529 | France | May 1, 1925 |
| 8,686 | Great Britain | Series of 1899 |

OTHER REFERENCES

"Methods of Determining Gloss" by R. S. Hunter, Bureau of Standards Research Paper RP958; published January 1937; pgs. 35 and 36 and plate opposite pg. 23 cited. (Copy in Division 7, U. S. Patent Office.)